United States Patent
Stevens

(10) Patent No.: US 9,563,244 B2
(45) Date of Patent: Feb. 7, 2017

(54) APPARATUSES, SYSTEMS, AND METHODS FOR REDUCING POWER TO PORTS OF ELECTRONIC DEVICES

(71) Applicant: HzO, Inc., Draper, UT (US)

(72) Inventor: Blake Stevens, Morristown, NJ (US)

(73) Assignee: HZO, Inc., Draper, UT (US)

( * ) Notice: Subject to any disclaimer, the term of this patent is extended or adjusted under 35 U.S.C. 154(b) by 0 days.

(21) Appl. No.: 14/150,294

(22) Filed: Jan. 8, 2014

(65) Prior Publication Data

US 2014/0191588 A1 Jul. 10, 2014

Related U.S. Application Data

(60) Provisional application No. 61/750,325, filed on Jan. 8, 2013.

(51) Int. Cl.
*H02J 1/00* (2006.01)
*G06F 1/26* (2006.01)
*G06F 1/16* (2006.01)

(52) U.S. Cl.
CPC .............. *G06F 1/266* (2013.01); *G06F 1/1632* (2013.01); *H02J 1/00* (2013.01); *Y10T 307/826* (2015.04)

(58) Field of Classification Search
CPC ........................................................ H02J 1/00
USPC ......................................... 307/116, 118–119
See application file for complete search history.

(56) References Cited

U.S. PATENT DOCUMENTS

| | | | |
|---|---|---|---|
| 3,898,547 A * | 8/1975 | Poole ............................. | 320/109 |
| 4,994,726 A * | 2/1991 | Tamura et al. ............... | 320/107 |
| 5,291,118 A * | 3/1994 | Kojima ......................... | 320/150 |
| 5,831,520 A * | 11/1998 | Stephan ................ | B60R 25/225 |
| | | | 307/10.1 |
| 5,865,635 A * | 2/1999 | Hsiang et al. ................ | 439/188 |
| 5,999,384 A * | 12/1999 | Chen et al. .................... | 361/42 |
| 6,061,261 A * | 5/2000 | Chen et al. .................. | 363/146 |
| 6,157,303 A | 12/2000 | Bodie et al. | |
| 6,157,765 A | 12/2000 | Bruce et al. | |
| 6,445,086 B1 * | 9/2002 | Houston ........................ | 307/24 |

(Continued)

FOREIGN PATENT DOCUMENTS

DE 10203815 C1 4/2003
JP 09-107327 4/1997

(Continued)

OTHER PUBLICATIONS

United States Patent and Trademark Office acting as the International Searching Authority, "International Search Report and Written Opinion," mailed Mar. 14, 2013, in PCT application No. PCT/US2013/020376.

(Continued)

*Primary Examiner* — Adi Amrany
(74) *Attorney, Agent, or Firm* — Kunzler Law Group

(57) ABSTRACT

Methods, apparatuses and systems for reducing or selectively terminating the power supplied to or the voltage present at the ports of electronic devices are disclosed. Methods, apparatuses and systems for reducing or terminating the power supplied to and, thus, the voltage across electrical contacts of one or more ports of a portable electronic device when the port is not in use may be effected in a variety of ways and may prevent corrosion or other moisture-induced damage to each port, and to the electronic device of which the port is a part.

13 Claims, 7 Drawing Sheets

(56) References Cited

U.S. PATENT DOCUMENTS

| | | |
|---|---|---|
| 6,516,418 B1 | 2/2003 | Lee |
| 6,552,888 B2* | 4/2003 | Weinberger ............... 361/57 |
| 7,050,837 B2 | 5/2006 | Menz et al. |
| 7,332,834 B2* | 2/2008 | Lee ........................ 307/131 |
| 7,411,317 B2* | 8/2008 | Liu ......................... 307/112 |
| 7,446,432 B2* | 11/2008 | Cha ......................... 307/64 |
| 7,550,873 B2* | 6/2009 | Jiang et al. ............... 307/64 |
| 7,795,759 B2* | 9/2010 | DuBose et al. ........... 307/126 |
| 7,800,252 B2* | 9/2010 | DuBose et al. ........... 307/126 |
| 7,880,591 B2 | 2/2011 | Johnson et al. |
| 7,960,944 B2* | 6/2011 | Hoffman et al. .......... 320/107 |
| 7,977,823 B2* | 7/2011 | DuBose et al. ........... 307/126 |
| 7,978,447 B2* | 7/2011 | Baxter ...................... 361/42 |
| 8,000,858 B2* | 8/2011 | Tonegawa et al. ......... 701/36 |
| 8,030,890 B2* | 10/2011 | Hyatt ....................... 320/114 |
| 8,063,765 B2 | 11/2011 | Johnson et al. |
| 8,169,196 B2* | 5/2012 | Vantu et al. ............... 320/165 |
| 8,198,757 B2* | 6/2012 | Brink et al. .............. 307/119 |
| 8,259,221 B1* | 9/2012 | Kaplan et al. ............ 348/372 |
| 8,368,350 B2* | 2/2013 | Iwanaga et al. .......... 320/109 |
| 8,374,729 B2* | 2/2013 | Chapel et al. ............ 700/295 |
| 8,519,566 B2* | 8/2013 | Recker et al. ............. 307/64 |
| 8,816,853 B1* | 8/2014 | Kelsch ............. G08B 13/1454 |
| | | 340/568.1 |
| 8,886,971 B2 | 11/2014 | Chuang |
| 2002/0074970 A1* | 6/2002 | Kawashima ............... 320/107 |
| 2002/0097546 A1* | 7/2002 | Weinberger ............... 361/103 |
| 2002/0101695 A1* | 8/2002 | Saksa ........................ 361/64 |
| 2002/0112945 A1* | 8/2002 | Lawson et al. ........... 200/50.28 |
| 2004/0130288 A1* | 7/2004 | Souther et al. ............ 320/104 |
| 2004/0257037 A1* | 12/2004 | Hartung et al. ........... 320/114 |
| 2006/0036885 A1* | 2/2006 | Hsieh ....................... 713/300 |
| 2006/0125434 A1* | 6/2006 | Frohne et al. ............. 318/139 |
| 2006/0181241 A1* | 8/2006 | Veselic .................... 320/107 |
| 2007/0038334 A1* | 2/2007 | Chou et al. ............... 700/292 |
| 2007/0046106 A1* | 3/2007 | Shintomi .................. 307/64 |
| 2007/0182368 A1* | 8/2007 | Yang ........................ 320/110 |
| 2007/0254697 A1 | 11/2007 | Sugio et al. |
| 2008/0005430 A1 | 1/2008 | Kozenitzky et al. |
| 2008/0164768 A1* | 7/2008 | Litwack .................... 307/116 |
| 2008/0204218 A1 | 8/2008 | Tupman et al. |
| 2009/0001938 A1* | 1/2009 | Vantu et al. ............... 320/165 |
| 2009/0015372 A1 | 1/2009 | Kady |
| 2009/0119520 A1* | 5/2009 | Yoshioka et al. .......... 713/300 |
| 2009/0122633 A1 | 5/2009 | Roewer |
| 2009/0129128 A1* | 5/2009 | Hirahara ..................... 363/49 |
| 2009/0160404 A1* | 6/2009 | Iwai ......................... 320/138 |
| 2009/0263581 A1 | 10/2009 | Martin, III et al. |
| 2009/0263641 A1 | 10/2009 | Martin, III et al. |
| 2010/0033883 A1 | 2/2010 | Simon |
| 2010/0270860 A1* | 10/2010 | Kamaga .................... 307/10.7 |
| 2010/0271182 A1* | 10/2010 | Yashukova ........ G01R 31/043 |
| | | 340/10.1 |
| 2010/0302757 A1* | 12/2010 | Bennett, Jr. ................ 361/819 |
| 2010/0304091 A1 | 12/2010 | Wang |
| 2011/0104940 A1 | 5/2011 | Rabu et al. |
| 2011/0121985 A1 | 5/2011 | Yamamoto |
| 2011/0131003 A1 | 6/2011 | Tusvik |
| 2011/0147174 A1 | 6/2011 | Chuang |
| 2011/0161694 A1* | 6/2011 | Fujiwara ................... 713/310 |
| 2011/0170249 A1* | 7/2011 | Nunes ................ G01D 9/005 |
| | | 361/679.01 |
| 2011/0208993 A1 | 8/2011 | Samoilova et al. |
| 2011/0262740 A1 | 10/2011 | Martin, III et al. |
| 2011/0264398 A1 | 10/2011 | Niewczas et al. |
| 2011/0279931 A1 | 11/2011 | Nakamura |
| 2011/0279987 A1* | 11/2011 | Otani ................. H04M 1/0274 |
| | | 361/752 |
| 2012/0026018 A1 | 2/2012 | Lin |
| 2012/0194952 A1* | 8/2012 | Crucs ......................... 361/52 |
| 2013/0044420 A1* | 2/2013 | Iwamoto ............. H01R 13/447 |
| | | 361/679.01 |
| 2013/0060144 A1* | 3/2013 | Culjat .................. A61B 8/0875 |
| | | 600/459 |
| 2013/0098712 A1* | 4/2013 | Svendsen ............. A61G 7/1005 |
| | | 187/381 |
| 2013/0111100 A1* | 5/2013 | Ghosh et al. .............. 710/315 |
| 2013/0151870 A1* | 6/2013 | Chuang .................... G06F 1/26 |
| | | 713/300 |
| 2013/0162198 A1* | 6/2013 | Yokota et al. .............. 320/107 |
| 2013/0167226 A1* | 6/2013 | Lin ..................... H04M 1/0256 |
| | | 726/19 |
| 2013/0174410 A1 | 7/2013 | Stevens et al. |
| 2013/0176691 A1 | 7/2013 | Stevens et al. |
| 2013/0176700 A1 | 7/2013 | Stevens et al. |
| 2013/0182360 A1 | 7/2013 | Stevens et al. |
| 2013/0225237 A1 | 8/2013 | Minami |
| 2013/0286567 A1 | 10/2013 | Sorenson et al. |
| 2013/0290764 A1* | 10/2013 | Taki ......................... 713/340 |
| 2013/0295782 A1* | 11/2013 | Goel .......................... 439/40 |
| 2013/0335898 A1 | 12/2013 | Stevens et al. |
| 2014/0028243 A1* | 1/2014 | Rayner ................... G06F 1/163 |
| | | 320/103 |
| 2014/0075212 A1* | 3/2014 | Urbina et al. .............. 713/300 |
| 2014/0151079 A1* | 6/2014 | Furui ........................ B25F 5/02 |
| | | 173/46 |

FOREIGN PATENT DOCUMENTS

| | | |
|---|---|---|
| JP | 2003-115949 | 4/2003 |
| JP | 2004-235724 | 8/2004 |
| JP | 2004-297629 | 10/2004 |
| JP | 2006-277129 | 10/2006 |
| JP | 2010-035036 | 2/2010 |
| JP | 2011-171894 | 9/2011 |
| JP | 2012-074798 | 4/2012 |
| WO | 03/065691 A2 | 8/2003 |
| WO | 2006/028030 A1 | 3/2006 |

OTHER PUBLICATIONS

United States Patent and Trademark Office, Acting as the International Searching Authority, "International Search Report and Written Opinion," mailed May 2, 2014, in related PCT application No. PCT/US2014/010720.

United States Patent and Trademark Office Acting as the International Searching Authority, "International Search Report and Written Opinion," mailed Aug. 28, 2014 in corresponding international application No. PCT/US2014/010649.

Taiwan Intellectual Property Office, "Official Letter" and "Search Report," mailed Dec. 12, 2014, in Taiwan patent application No. 102100828.

European Patent Office, "Supplementary European Search Report," mailed Sep. 29, 2014 in European patent application No. 13736121.8.

\* cited by examiner

APPARATUSES, SYSTEMS, AND METHODS FOR REDUCING POWER TO PORTS OF ELECTRONIC DEVICES

CROSS-REFERENCE TO RELATED APPLICATION

A claim for the benefit of priority is hereby made pursuant to 35 U.S.C. §119(e) to the Jan. 8, 2013 filing date of U.S. Provisional Patent Application Ser. No. 61/750,325, titled APPARATUSES, SYSTEMS, AND METHODS FOR REDUCING POWER TO PORTS OF ELECTRONIC DEVICES, The entire disclosure of which is hereby incorporated herein.

TECHNICAL FIELD

This disclosure relates generally to methods and systems for reducing or selectively terminating the power supplied to ports of electronic devices. In particular, this disclosure relates to methods and systems for reducing or terminating the power supplied to and, thus, the voltage across electrical contacts of one or more ports of a portable electronic device when the port is not in use.

BACKGROUND OF RELATED ART

The durability of electronic devices is a major concern to consumers. Protective cases for cell phones, tablets, laptops, and other electronic devices are in high demand. Most protective cases provide protection from scratches and other physical damage; very few protective cases provide protection against water damage. Protective cases that provide protection against water damage do so by ensuring that the electronic device is not exposed to water, and generally encase or envelop the entire electronic device. As a result, waterproof cases tend to be somewhat bulky or large and may limit access to the electronic device.

Some companies, such as HzO, Inc., take a different approach to protecting electronic devices from water. HzO's approach employs the application of a thin film, or protective coating, to circuitry and/or components inside of an electronic device. This protective coating protects the electronic device from exposure to water and other types of moisture without requiring a bulky external protective case. The moisture-resistant coatings that have been developed by HzO protect electronic devices from a variety of different types of incidental or accidental exposure to moisture, including high humidity, rain, spilled drinks, the washing machine, or even if the device is immersed in water.

While protective coatings like those developed by HzO may protect the interior of an electronic device, the ports of the electronic device, including ports that enable charging of the battery of the electronic device and/or enable the electronic device to electrically couple to and/or communicate with other devices (e.g., computers, peripheral devices, etc.) are typically still exposed to moisture, as it is necessary to establish electrical contact with the electrically conductive features (e.g., pins, leads, other electrical contacts, etc.) of the ports for the ports to serve their intended use(s).

The ports of an electronic device may be used for electrical charging of batteries or other portable power supplies, data transfer, audio output/input or other functions. Typically, when an electronic device is powered on, a constant voltage is applied to its ports, regardless of whether or not a connector is externally coupled to the port, and regardless of whether or not the port is in use. If such a port is exposed to water, a short circuit between one or more electrical connectors could damage the port or the electronic device. In addition, the voltage and resulting current, combined with the water and ions, dissolved solids or other materials in the water, can degrade or damage the port by facilitating corrosion of the electrical connections.

SUMMARY

This disclosure, in one aspect, relates to approaches for providing a reduced voltage state at one or more ports of an electronic device (e.g., a consumer electronic device; a portable electronic device (e.g., a cellular telephone, such as a smart phone, a tablet computer, a portable medial player, a camera, a laptop computer, etc.), a wearable electronic device, a medical device, etc.). A reduced voltage range may be a voltage that is closer to ground state than the normal operating voltage, a voltage that is less than about 90% of the normal voltage across contacts of a port or a voltage that is less than 99% of the normal voltage across contacts of the port. In some embodiments, the reduced voltage state may include terminating power to and, thus, a voltage across contacts of one or more ports of an electronic device. A voltage control element, or switch, associated with a port may provide a reduced voltage state for the port when a connector is not coupled to the port or another electronic device is not electrically connected with, or does not communicate with the electronic device through, the port.

The voltage control element may be configured to detect whether or not a connector is coupled with the port. The voltage control element may also include a power controller that puts the port in a normal voltage state when a connector is coupled with the port, and a reduced voltage state when no connector is coupled with the port.

The voltage control element may control the voltage state of the port and its electrical contacts by connecting and disconnecting the port from its power source. In some embodiments, the voltage control element comprises a switch that is activated (i.e., the supply of power to at least one contact of the port reaches an operational level, or resumes) when a connector from another device is inserted into the port and deactivated (i.e., the supply or power to at least one contact of the port is reduced or terminated) when the connector is removed from the port. The voltage control element may comprise a physical switch situated adjacent to the port or within an opening of the port.

The voltage control element may communicate with a controller of the electronic device, which in turn controls the supply of power to the port and, thus, the voltage state of the port.

The voltage control element may include a moisture sensor configured to detect the presence of moisture adjacent to a port or within a port. Upon detecting moisture, the moisture sensor may cause the voltage control element to cause the port to be placed into a reduced voltage state, and the voltage control element may maintain the reduced voltage state until the moisture sensor indicates that the moisture levels adjacent to the port or within the port are acceptable.

A port adapter may be configured for insertion into a port that has no associated voltage control element to enable the port to be switched between a reduced voltage state and a normal voltage state.

A system according to this disclosure includes an electronic device with a port and an associated voltage control element, as well as a connector that is configured to couple with the port. Optionally, such a system may also include another electronic device associated with the connector.

A method for preventing electrical shorting or corrosion of the contacts of a port may include placing a port in a reduced voltage state when no connector is coupled with the port, and placing the port in a normal (e.g., operational, etc.) voltage state when a connector is coupled with the port.

Other aspects, as well as features and advantages of various aspects, of the disclosed subject matter will become apparent to those of ordinary skill in the art from the ensuing description, the accompanying drawings and the appended claims.

DETAILED DESCRIPTION

Figure 1:
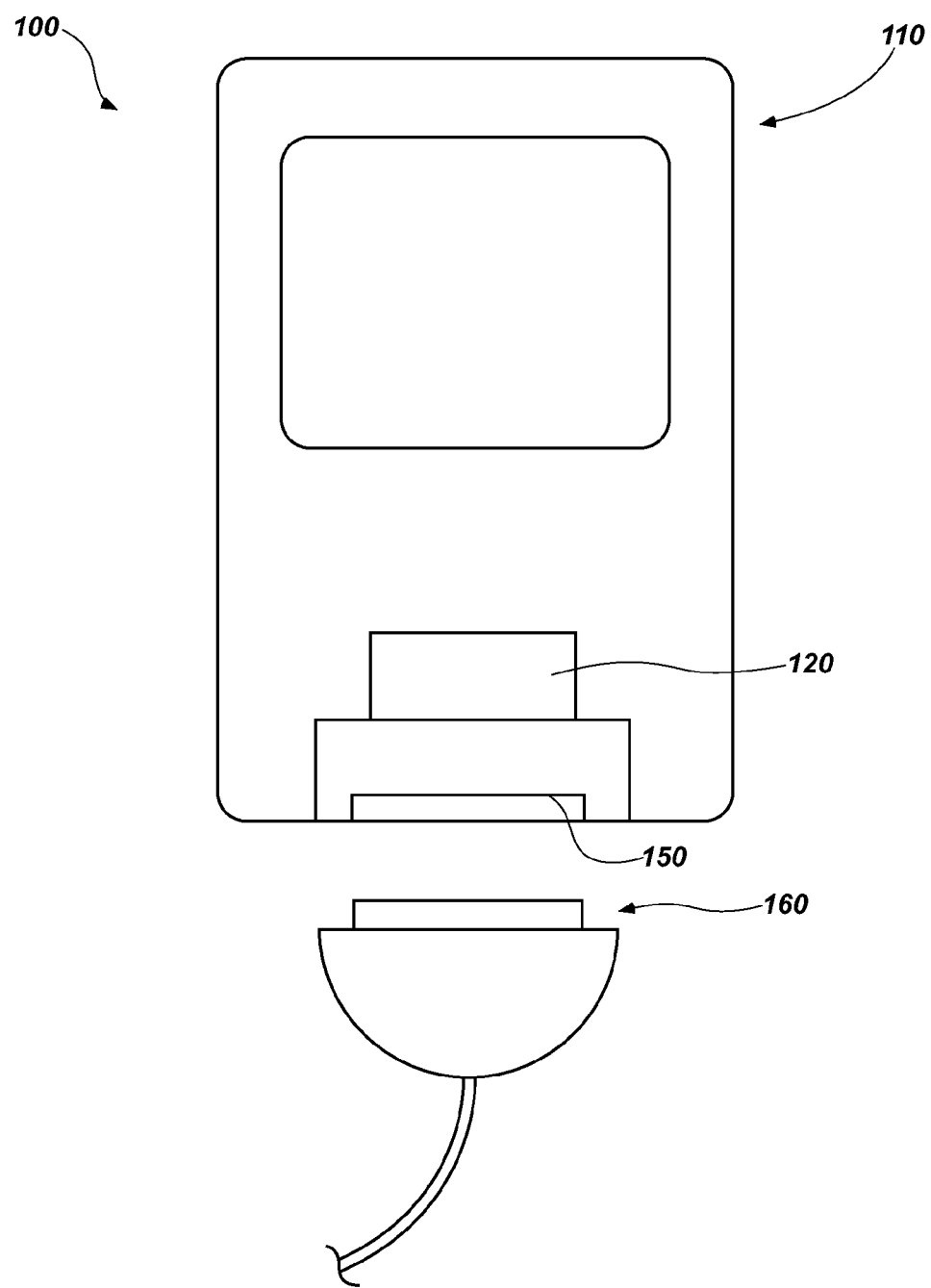
FIG. 1 is a schematic representation of an embodiment of a system comprising an electronic device that includes a voltage control element for controlling the supply of power to, and the voltage across, contacts of a port depending on whether or not a complementarily configured connector has been coupled with the port, as well as the complementary connector, which may be associated with another electronic device.

FIG. 1 illustrates an embodiment of a system 100 that includes an electronic device 110 and a connector 160 of another device (not shown). The electronic device 110 depicted by FIG. 1 includes at least one port 150 and a voltage control element 120 associated with each port 150. The electronic device 110 may be any variety of devices. For example, the electronic device 110 may be a portable electronic device, such as a cellular telephone, a tablet computer, a portable media player, a camera, a laptop computer, any other portable electronic device or any other electronic device.

Each port 150 of the electronic device 110 comprises a conventional port that physically couples to (e.g., receives, etc.) a connector 160 of or associated with another device (not shown). Some non-limiting embodiments of ports 150 include a micro, mini or standard universal serial bus (USB) connector, a proprietary power and/or data connector (e.g., Apple, Inc.'s 30-pin connector and LIGHTENING® connector, etc.), a subscribe identity module (SIM) card port, a tip-ring-sleeve (TRS) connector for an audio jack, a power charging port, or any other type of connector. The connector 160 may be at the end of a cable or cord, or it may be a part of any of a variety of devices, such as a dock connector. The connector 160 may comprise a stand-alone element, such as a cable or cord that connects an electronic device to a power source of another electronic device, a cable or cord or another device, such as a power source (e.g., an AC to DC adapter, etc.) or another electronic device, a stand-alone dock connector that is conjured to be coupled to a power source or another electronic device, or an intermediary device, such as a dock of another electronic device (e.g., an audio device, such as a stereo with a docking station; etc.).

The voltage control element 120 of the electronic device 110 is associated with the port 150 of the electronic device 110. The voltage control element 120 is configured to determine, enable determination of or provide an indicator of whether or not a connector 160 is coupled with the port 150. The voltage control element 120 is configured to enable power to be supplied to the port and put the port in a normal voltage state if a complementary connector 160 is properly coupled to the port 150. Conversely, the voltage control element 120 may be configured to reduce or eliminate power supplied to the port 150, and reduce a voltage state of the port 150, if a connector 160 is not properly connected to the port 150—even while the electronic device 110 is powered on and performing one or more functions. By reducing the power and/or voltage at the port 150 when no connector 160 is properly connected to the port 150, the voltage control element 120 may reduce the likelihood of corrosion of contacts of the port or a short circuit in the event that contacts of the port 150 are exposed to moisture.

FIG. 1 shows the voltage control element 120 as a component of the electronic device 110. The voltage control element 120 may be realized as hardware (e.g., as a mechanical and/or electrical switch, a proximity detector, an electrical contact, etc.) and, in some embodiments, be used with suitable programming.

Figure 2:
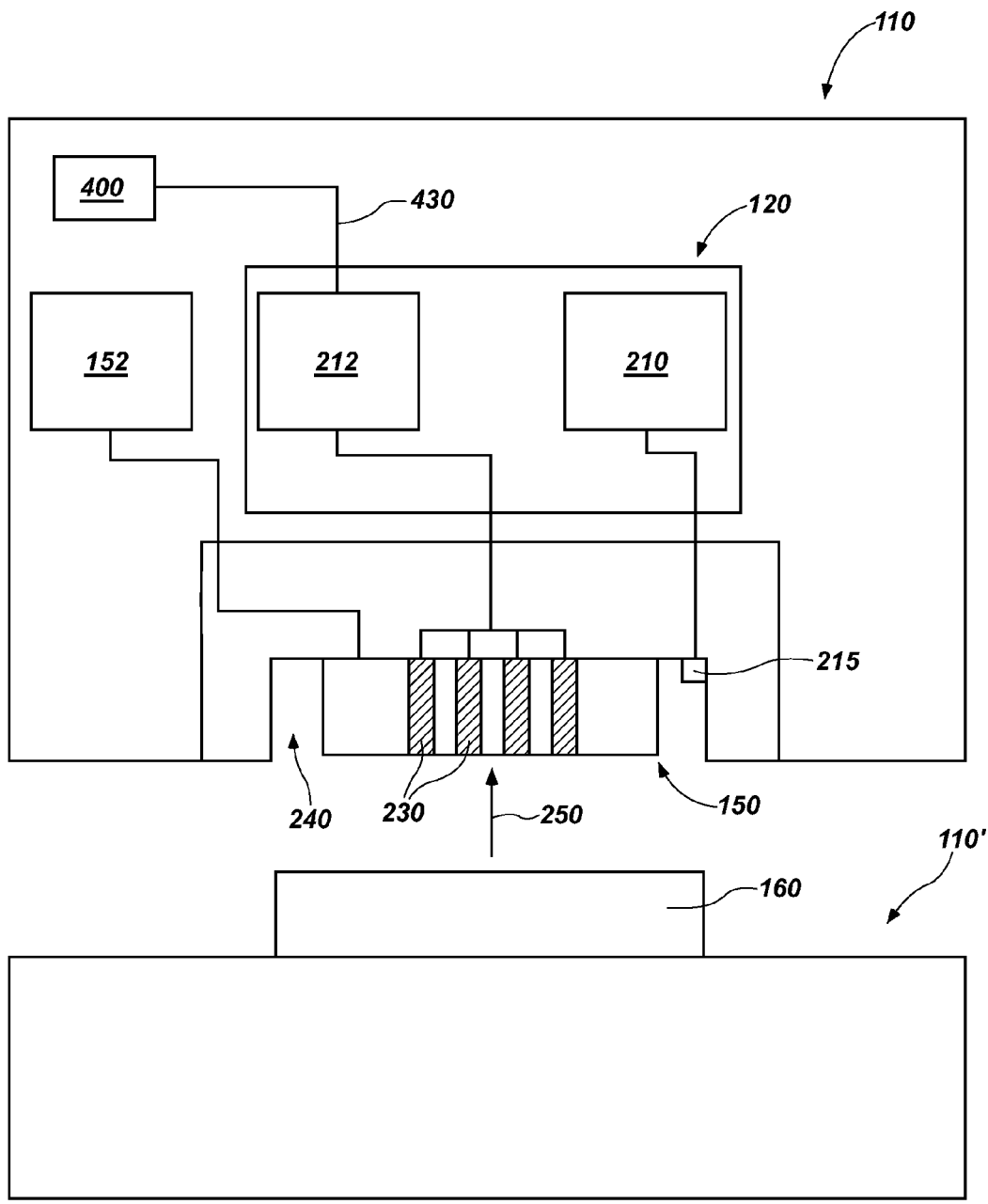
FIG. 2 is a schematic representation of an embodiment of a port and an associated voltage control element.

FIG. 2 shows an embodiment of a port 150 and a voltage control element 120 associated with the port 150. The port 150 includes electrical contacts 230. The connector 160 (FIG. 1) may include corresponding electrical contacts that correspond to and are configured to electrically connect with the electrical contacts 230 of the port 150, facilitating the communication of data and/or power through the port 150. Accordingly, the connector 160 may include at least a section that is sized to fit within an opening 240 of the port 150 and to couple with and establish electrical communication with the port 150.

The voltage control element 120 may include a device detector 210 and a power controller 212.

The device detector 210 may be configured to detect whether or not a connector 160 is properly coupled with, or connected to, the port 150 and/or whether or not another electronic device 110' is connected to the electronic device 110 through the connector 160 and the port 150. Stated again, the device detector 210 may determine that the port 150 is in one of two states: (1) coupled with a connector 160 or in communication with another electronic device 110' through the connector 160 and the port 150; or (2) not coupled with a connector 160 or in communication with another electronic device 110' through the connector 160 and the port 150.

In one embodiment, the device detector 210 uses a logical determination to determine whether or not a connector 160 has been coupled with the port 150 or another electronic device 110' is in communication with the electronic device 110 through the connector 160 and the port 150. As used herein, a logical determination refers to an approach, such as that illustrated by and disclosed in reference to FIG. 7, that uses data communicated to and/or from the port 150 to determine whether or not the electronic device 110 communicates with another electronic device 110' through the port 150. For example, the electronic device 110 may include a controller 152 associated with the port 150 (e.g., a USB controller with a USB port, etc.). When a connector associated with another electronic device 110' communicates through the port 150, a controller or processing element of that electronic device 110' may perform an enumeration process with the controller 152. The device detector 210 may listen for communications from the other electronic device 110' on the bus of the electronic device 110 to determine whether or not a connector 160 associated with the other electronic device 110' has been electrically connected to the port 150 of the electronic device 110. The term "bus" is used herein to broadly encompass a variety of approaches for communicating data, including, without limitation, peripheral component interconnect (PCI), PCI-express, InfiniBand, HyperTransport, USB, and others. The other electronic device 110' may generate an interrupt or other message when the connector 160 associated therewith is electrically connected to the port 150. The device detector 210 may listen for such a message and may determine whether or not the connector 160 associated with the other electronic device 110' is electronically connected to the port 150 based on that message.

In another embodiment, the device detector 210 may poll the port 150 at intervals of time to determine whether or not a connector 160 associated with another electronic device 110' has been coupled with and electrically connected to the port 150. The device detector 210 may put the port 150 in a normal voltage state and then confirm that a connector 160 associated with another electronic device 110' is electrically connected to the port 150 by, for example, sending or listening for one or more messages, as described previously herein. If a message is detected, the device detector 210 may confirm that communication has been established with another electronic device 110' through the port 150. If a message is not detected, the device detector 210 may determine that communication has not been established with another electronic device 110' through the port 150 and the device detector 210 may return the port 150 to the reduced voltage state.

In other embodiments, the device detector 210 may electromagnetically determine whether or not communication has been established with another electronic device 110' through the port 150. Electromagnetic determination may employ one or more sensors to monitor the electromagnetic properties of the port 150 and/or of components attached to or otherwise associated with the port 150. For example, the device detector 210 may monitor the resistance of one or more of the electrical contacts 230 of the port 150. If a connector 160 is coupled with the port 150, the connector 160 may affect the measured resistance of one or more of the electrical contacts 230. Upon detecting this change in resistance, the device detector 210 may determine that a connector 160 has coupled with the port 150. Alternatively, the device detector 210 may measure the voltage or the current at one or more of the electrical contacts 230 or other components connected to them to determine whether or not a connector 160 has been coupled with the port 150 or another electronic device 110' communicates with the electronic device 110 through the port 150.

In other embodiments, the device detector 210 may mechanically determine whether or not a connector 160 has been coupled with the port 150. A "mechanical determination" uses a mechanical action (e.g., that caused by physically coupling a connector 160 with the port 150, etc.) to determine whether or not a connector 160 has been properly connected to the port 150. In the embodiment shown in FIG. 2, a mechanical switch 215 communicates with the device detector 210 in a manner that enables detection of a connector 160 coupled with the port 150. For example, the mechanical switch 215 may be located within the opening 240 of the port 150 at a location that will not interfere with proper coupling of the connector 160 and the port 150, but will enable the mechanical switch 215 to be actuated upon proper insertion of a connector 160 into the opening 240 and/or upon proper coupling of the connector 160 with the port 150. In embodiments where a mechanical switch 215 is used, actuation of the mechanical switch 215 may cause the device detector 210 to put the port 150 in its normal voltage state. In some embodiments, the mechanical switch 215 may be depressed, and the device detector 210 may detect that a connector 160 has been coupled with the port 150, as an electrical connection is established between the connector 160 and the port 150. In other embodiments, the device detector 210 may determine that the connector 160 has been coupled with the port 150 before an electrical connection is established between these elements. Such an embodiment may enable the device detector 210 to restore the port 150 to its normal voltage state before the electrical connection is established between the port 150 and the connector 160.

Conversely, the mechanical switch 215 may be deactivated upon (e.g., concurrently with, immediately following, etc.) at least partially uncoupling a connector 160 from the port 150. Such action may put the port 150 in a reduced voltage state.

The device detector 210 is not limited to the foregoing examples in detecting whether or not the a connector has been coupled with the port 150, or whether or not another electronic device 110' communicates with the electronic device 110 through the port 150. As another option, the device detector 210 may operate in conjunction with one or more proximity sensors or other features that enable a determination of the state of coupling, or assembly, between a connector 160 and a port 150. The device detector 210 may, in certain embodiments, be configured to use combinations of approaches; for example, the device detector 210 may work in conjunction with a mechanical switch 215 to make an initial determination that a connector 160 has been coupled with a port 150 and, in response, temporarily put the port 150 in its normal voltage state, and then use one or more logical approaches to confirm that the connector 160 has been coupled with the port 150.

If the device detector 210 determines that a connector 160 is properly connected to the port 150 (i.e., the connector 160 is configured complimentarily to the port 150 and is properly positioned relative to the port 150) or another electronic device 110' communicates with the electronic device 110 through the port 150, the device detector 210 may communicate the same to the power controller 212, which may then adjust the voltage state of the port 150 accordingly. A normal voltage state refers to a voltage state for the port 150 that occurs under normal operating conditions of the electronic device 110 and the port 150. In the normal voltage state, the electrical contacts 230 of a port 150 are at a non-zero voltage.

For example, a USB port 150 on a so-called "host" or "primary" electronic device 110 (e.g., a laptop computer, etc.) may have a normal voltage state of a +5 V signal at one electrical connector 230 and a 0 V (ground) signal at another electrical connector 230, which voltages are used to provide power to peripheral devices, even if no connector 160 is properly coupled with the USB port 150.

As another example, a USB port 150 of a so-called "ancillary" or "peripheral" electronic device 110 may have a 3.3 V signal on either its D+ line or its D− line to indicate the speed of the electronic device 110 and to enable the host or hub of another electronic device 110' to which the electronic device 110 is connected, to detect the presence of the electronic device 110; when the electronic devices communicate with one another through the port 150—even if no connector 160 is properly coupled with the USB port 150. The normal voltage state for a port 150 may differ from one type of port to another or from one port to another, and may also differ on the basis of whether the electronic device 110 is a host device or an ancillary device.

If the device detector 210 determines that a connector 160 is not properly connected to the port 150, or if another electronic device 110' does not communicate with the electronic device 110 through the port 150, the power controller 212 puts the port 150 in a reduced voltage state. A reduced voltage state for the port 150 refers to a voltage state that is closer to ground (zero volts) than the normal voltage state for the port 150. In one embodiment, each of the electrical contacts 230 of the port 150 is set to substantially zero volts or to zero volts when the port 150 is in the reduced voltage state.

In another embodiment, the reduced voltage state is one where less than all of the electrical contacts 230 are set to substantially zero volts or to zero volts. For example, the power controller 212 may leave one electrical contact 230 at its normal voltage, but reduce the voltage of all of the other electrical contacts 230 to substantially zero volts or to zero volts. Such an embodiment may reduce the risk of short circuit and corrosion while enabling the port 150 to signal to the device detector 210 that a connector 160 has been properly connected to the port 150, or that another electronic device 110' is in communication with the electronic device 110 through the port 150. The device detector 210 may, upon determining that a connector 160 has been connected to the port 150 and/or that another electronic device 110' communicates with the electronic device 110 through the port 150, cause the power controller 212 to return the port 150 to its normal voltage state.

In another embodiment, the reduced voltage state is one where a smaller than normal voltage (e.g., a voltage closer to ground than to the absolute value of the voltage of the normal voltage state, etc.) is applied to one or more of the electrical contacts 230. Such a reduced voltage may comprise a small, but measurable voltage that facilitates easier detection of a connector 160 and any electronic device 110 associated therewith by the device detector 210.

The power controller 212 may be situated between the port 150 and a bus 430 for communicating data and/or power to and from the port 150. The term "bus" is used herein to broadly encompass a variety of approaches for communicating data, including, without limitation, peripheral component interconnect (PCI), PCI-express, InfiniBand, HyperTransport, USB, and others. The power controller 212 may be electrically transparent to the bus 430 and other devices in communication with the bus 430. The power controller 212 may also be electrically transparent to other electronic devices 110' that communicate with the electronic device 110 through a connector 160 and the port 150. When the power controller 212 (which may operate under control of a program) provides the port 150 with a normal voltage state, and the electronic device 110 and another electronic device 110' are electrically connected through the port 150, the power controller 212 may act as a pass-through that simply passes along messages through the port 150. In some embodiments, the power controller 212 may intercept messages to the port 150. In other embodiments, the power controller 212 may emulate the port 150 on the bus 430 such that the transitions of the port 150 between the normal voltage state and a reduced voltage state are hidden from the bus 430 and the devices connected to it.

In some embodiments, such as that depicted by FIG. 2, the port 150 may receive power over the bus 430. The power controller 212 may provide a reduced voltage state by electrically disconnecting the port 150 from its power source 400. The power controller 212 may provide the normal voltage state by electrically connecting the port 150 to the power source 400. The power controller 212 may act as a relay that connects the port 150 to the bus and disconnects the port 150 from the bus 430.

Figure 3:
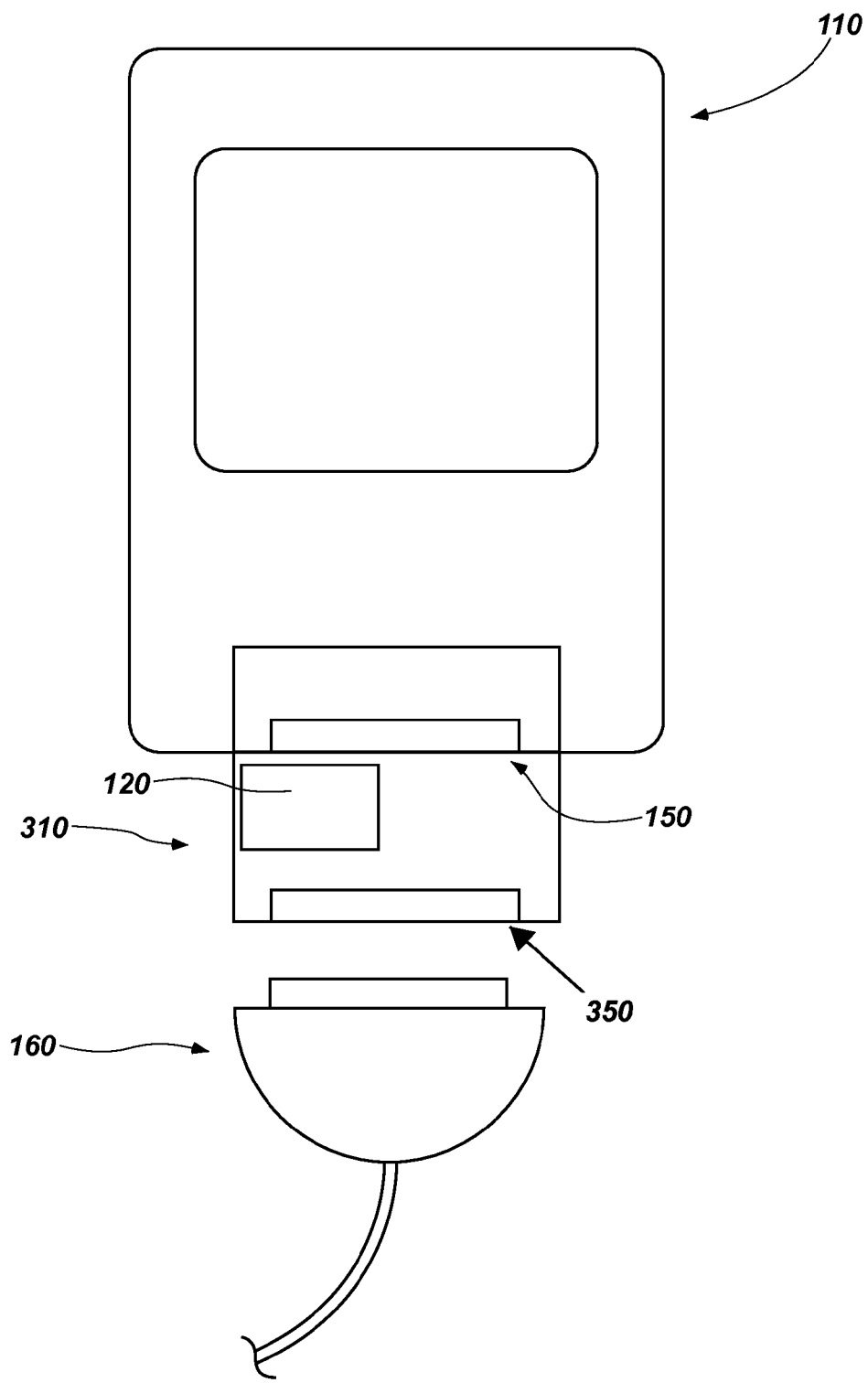
FIG. 3 is a schematic representation of a system including an electronic device with a conventional port and a port adapter that configured to couple with the port and includes a port extender and a voltage control element.

FIG. 3 shows an embodiment of a port adapter 310 for use with an electronic device 110. The port adapter 310 includes a port 150 and a voltage control element 120. The port adapter 310 is configured to connect with a port 150 and facilitates communication and/or power transfer between the port 150 and a connector 160 that may be associated with another electronic device 110' (FIG. 2). The port 350 of the port adapter 310 is configured to couple with the connector 160 and, thus, to enable communication between an electronic device 110' associated with the connector 160 and the electronic device 110 through the port 150 of the electronic device 110. The port 350 may have the same configuration as the port 150 of the electronic device 110 or a different configuration. The voltage control element 120 of the port adapter 310 may function in the same manner or a manner similar to the function of the voltage control elements 120 described in reference to FIGS. 1 and 2. The voltage control element 120 may include a device detector 210 that detects whether or not a connector 160 is coupled with the port 350, and a power controller 212 that controls the voltage state of the port 350, like the device detector 210 and the power controller 212, respectively, described in reference to FIG. 2.

The port adapter 310 may be configured to form a watertight seal against an exterior of the electronic device 110 when the port adapter 310 is coupled with the port 150, such that liquid cannot enter the port 150 between the port adapter 310 and the exterior of the electronic device 110 (e.g., the port adapter 310 may include a sealing element, etc.).

Figure 4:
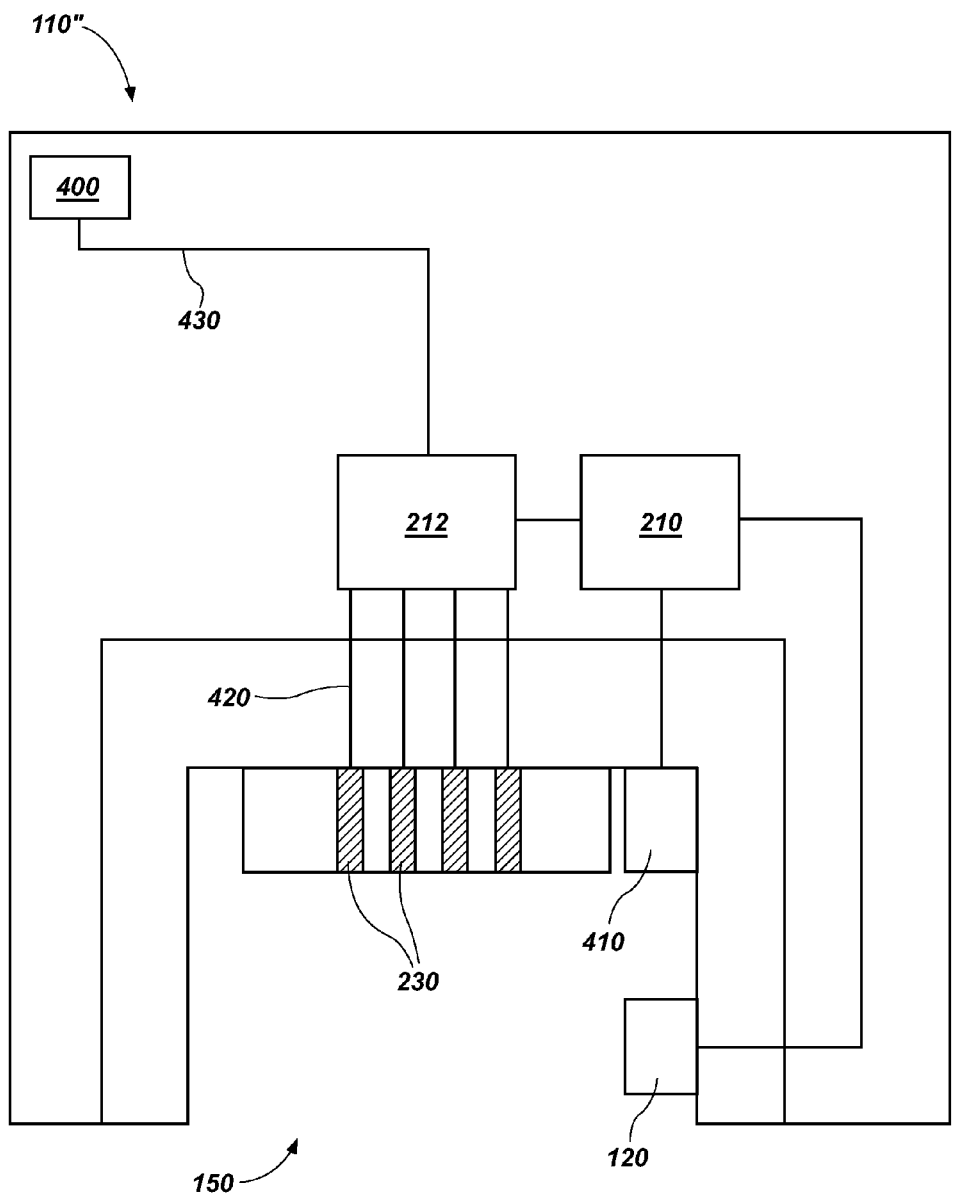
FIG. 4 is a schematic representation of an embodiment of a port, with which a voltage control element and a moisture detector are associated.

In FIG. 4, an embodiment of an electronic device 110" is depicted that includes a port 150, a voltage control element 120 associated with the port 150 and a device detector 210 and a power controller 212 associated with one another and with the port 150. In addition, the electronic device 110" may include a moisture sensor 410. The moisture sensor 410 may be configured and positioned to detect the presence of moisture at the port 150. The moisture sensor 410 may indicate whether the port 150 is submerged in liquid, is contacted by moisture or is exposed to humidity. When the moisture sensor 410 detects moisture, the device detector 210 may cause the power controller 212 to put the port 150 in a reduced voltage state. The device detector 210 may further cause the power controller 212 to maintain the port 150 in the reduced voltage state while the moisture sensor 410 continues to sense moisture. In such an embodiment, the device detector 210 and the power controller 212 may keep the port 150 in the reduced voltage state even if a connector 160 is coupled with the port 150 or another electronic device 110' communicates with the electronic device 110" through the port 150. By keeping the port 150 in the reduced voltage state when moisture is sensed by the moisture sensor 410, the device detector 210 may reduce the possibility of corrosion or other damage to the electrical contacts 230 of the port 150, electrical shorting between the electrical contacts 230 or damage to other components of the electrical device 110".

Figure 5:
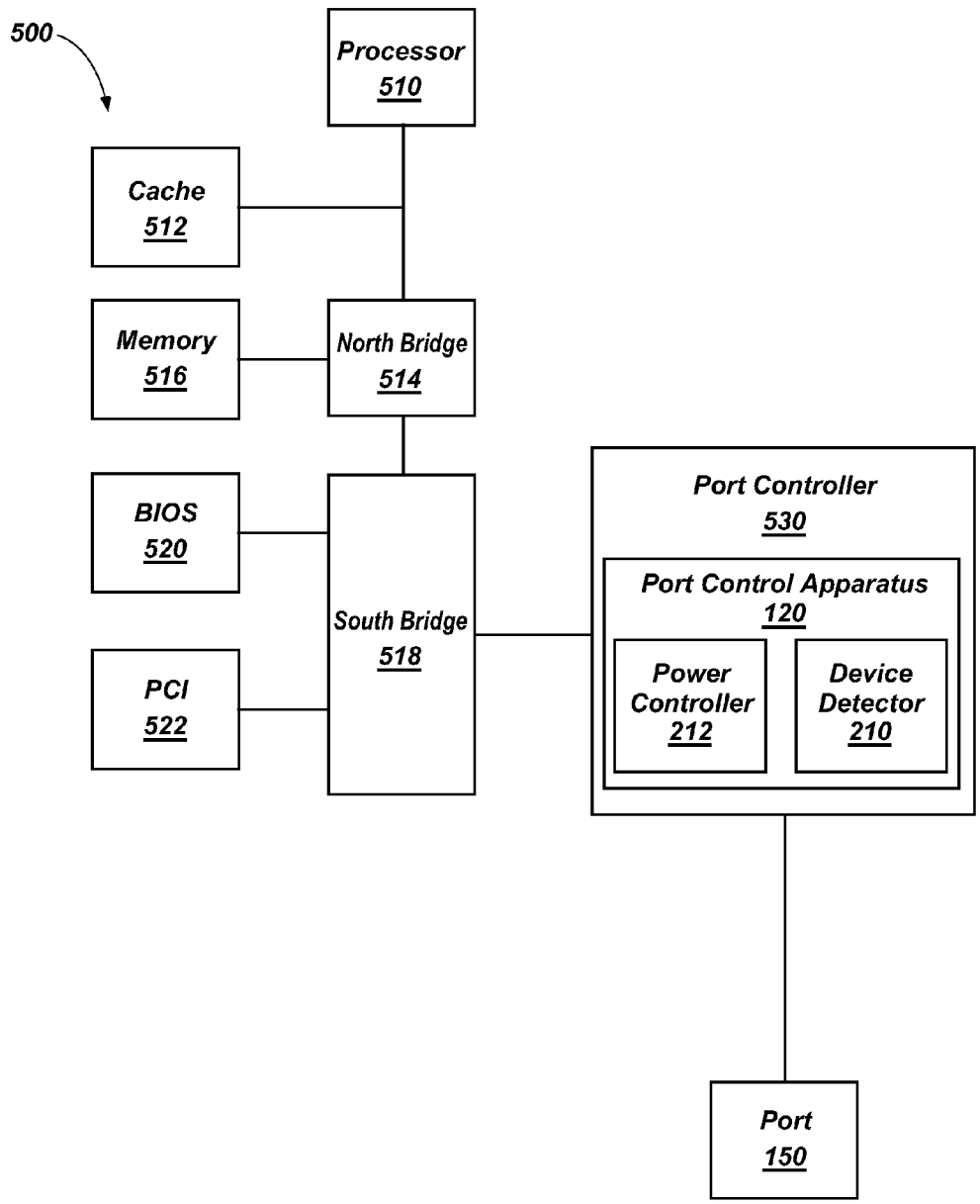
FIG. 5 is a block diagram of an embodiment of an architecture of an electronic device with a voltage control element.

Turning now to FIG. 5, a more specific embodiment of a system 500 for controlling the voltage states of a port 150 is illustrated. In the depicted embodiment, the system 500 includes a processor 510, a cache 512, a north bridge 514, memory 516, a south bridge 518, a basic input/output system (BIOS) 520, PCI 522, a port controller 530, and a port 150. The system 500 may include more, fewer, or different components than those shown in FIG. 5; for example, the system 500 may include a serial AT attachment (SATA) controller, a network interface card (NIC), or another component.

While the ensuing description relates to a specific embodiment, the components of the described system 500 may be arranged in a different manner than that described hereinafter. Without limitation, the features and functionality of the north bridge 514 and the south bridge 518, as described below, could be flipped.

The processor 510 may, under control of appropriate programming, execute a series of stored instructions for the system 500. The programming, or instructions, and other data may be stored in memory 516. The memory 516 may be dynamic random access memory (DRAM), static random access memory (SRAM), or other suitable memory. The processor 510 may use a fast cache 512 to reduce the time necessary to access frequently used instructions and/or data stored by memory 516. The north bridge 514 is a component for handling communications between the processor 510, the memory 516, and the south bridge 518. The north bridge 514 may handle communications from other components as well, such as a video card.

The south bridge 518 provides input/output (I/O) functionality for the system 500 and allows the system 500 to make use of various additional components. The south bridge 518 may, for example, handle the BIOS 520, PCI 522, and a port controller 530. The south bridge 518 may provide additional functionality, such as direct memory access (DMA), Ethernet connectivity, or the like.

The port controller 530 includes hardware and software/firmware that may enable connectivity between an external electronic device 110' that communicates through the port 150 and the system 500. The port controller 530 may, in some embodiments, be integrated into the south bridge 518. In other embodiments, the port controller 530 is a separate element that communicates with the south bridge 518.

The device detector 210 and the power controller 212 may be embodied, in whole or in part, as part of the port controller 530. Without limitation, the power controller 212 and the device detector 210 may comprise firmware on the port controller 530. The power controller 212 in such an embodiment may leverage the existing functionality of the port controller 530 to manage the voltage state of the port 150. The port controller 530 may be configured to control the voltage levels at the electrical contacts 230 of the port 150 as part of its functionality for providing connectivity at the port 150.

The device detector 210 of such a port controller 530 may similarly determine whether or not another electronic device 110' communicates with the electronic device 110 through a connector (FIG. 2) and the port 150. For example, the port controller 530 may enable the device detector 210 to monitor changes in the voltage on the electrical contacts 230 of the port 150. The device detector 210 may use the port controller 530 to monitor other changes in electrical properties that indicate the electrical connection of connector 160 to the port and/or communication of the electronic device 110 with another electronic device 110' through the port 150. The device detector 210 may, for example, monitor for changes in resistance, current, or electrical properties.

The port 150 may include a switch 215 for detecting a connector 160 coupled with the port 150, as discussed above. In such embodiments, the system 500 may include a connector that couples the port controller 530 with the switch 215. The port controller 530 may, for example, be a chip with one or more electrical connectors, such as pins, that are not used. A pin of the chip implementing the port controller 530 may be connected to the switch 215. In such an embodiment, the device detector 210 implemented on the port controller 530 may be configured to recognize input on the pin as indicative of the presence and absence of a connector 160.

In certain embodiments, the port controller 530 is configured to receive messages from another electronic device 110' in advance of uncoupling a connector 160 from the port 150. The other electronic device associated with the connector 160 may share one or more communications with a port controller 530 in order to prepare for separation. For example, the electronic device 110 and the other electronic device may go through an ejection process before the other electronic device is disconnected to prevent data corruption. The device detector 210 may listen for one or more messages associated with the ejection process and, once the process is complete, notify the power controller 212 that the connector 160 is no longer coupled with the port 150. The device detector 210 may include a component implemented at the operating system (OS) level of the electronic device 110 that listens for appropriate messages indicating that the other electronic device is about to be disconnected.

Figure 6:
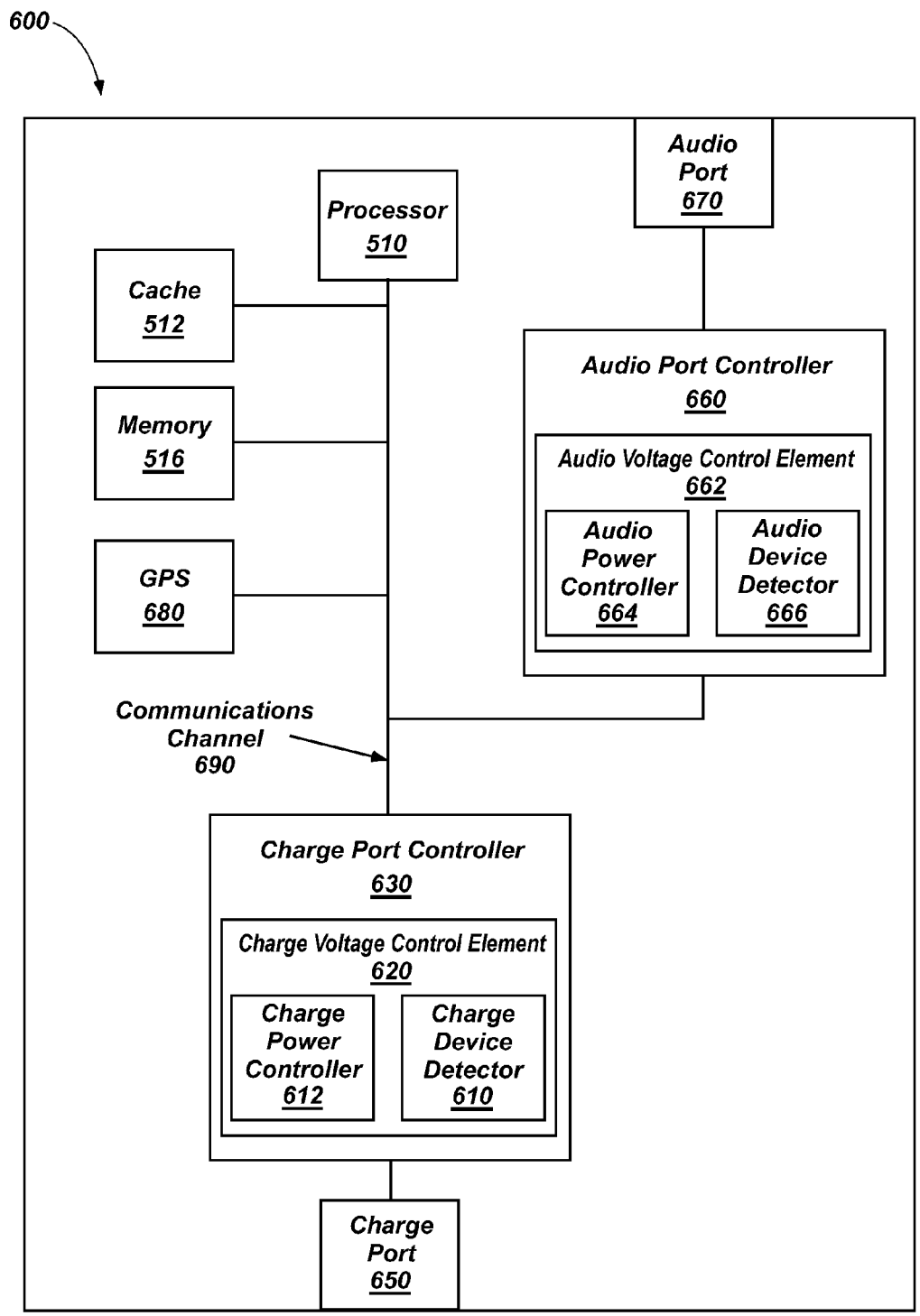
FIG. 6 is a block diagram representative of an embodiment of a cellular telephone with multiple ports and multiple voltage control elements.

FIG. 6 shows an embodiment of an electronic device that comprises a cellular telephone 600 with an audio port 670 and a charge port 650. The cellular telephone 600 may include a processor 510, a cache 512, memory 516, and other peripherals (such as the global positioning system GPS module 680), including a charge port controller 630 and an audio port controller 660. One or more of these components may be connected by a communications channel 690 that may include one or more controllers and electrical connections that facilitate sharing power and data among components of the cellular telephone 600. The charge port controller 630 manages the charge port 650 through which the battery of the cellular telephone 600 is charged. The charge port 650 and charge port controller 630 may provide other functions as well, such as sending and receiving audio, video, and other forms of data. The charge port 650 may be a USB port, a 30-pin port, a LIGHTNING® port, or any other suitable variety of port that may be used to charge a cellular telephone 600.

The audio port 670 of the cellular telephone 600 shown in FIG. 6 may be a TRS type audio port, as described above. The audio port controller 660 may be responsible for sending electrical signals to the audio port 670, which electrical signals can be converted to audio by headphones or other suitable audio device connected to the audio port 670.

In the depicted embodiment, the charge port controller 630 comprises a charge voltage control element 620 with a charge power controller 612 and a charge device detector 610. The charge voltage control element 620 provides the normal voltage state and the reduced voltage state for the charge port 650 based on whether a second device 160 is connected to the charge port 650. FIG. 6 represents the audio port controller 660 having an audio voltage control element 662 with an audio power controller 664 and an audio device detector 666. The audio voltage control element 662 provides the normal voltage state and a reduced voltage state for the audio port 670 based on whether or not another electronic device 110' (FIG. 2) is connected to the audio port 670.

While FIG. 6 shows a separate charge voltage control element 620 and audio voltage control element 662, in certain embodiments, the charge voltage control element 620 and audio voltage control element 662 may share one or more hardware and/or logical components. A cellular phone 600 may include additional ports 150 in addition to the charge port 650 and the audio port 670. In one embodiment, each port 150 of a cellular telephone 600 or another electronic device 110 (FIG. 2) has an associated voltage control element 120 that provides a normal voltage state and a reduced voltage state.

Figure 7:
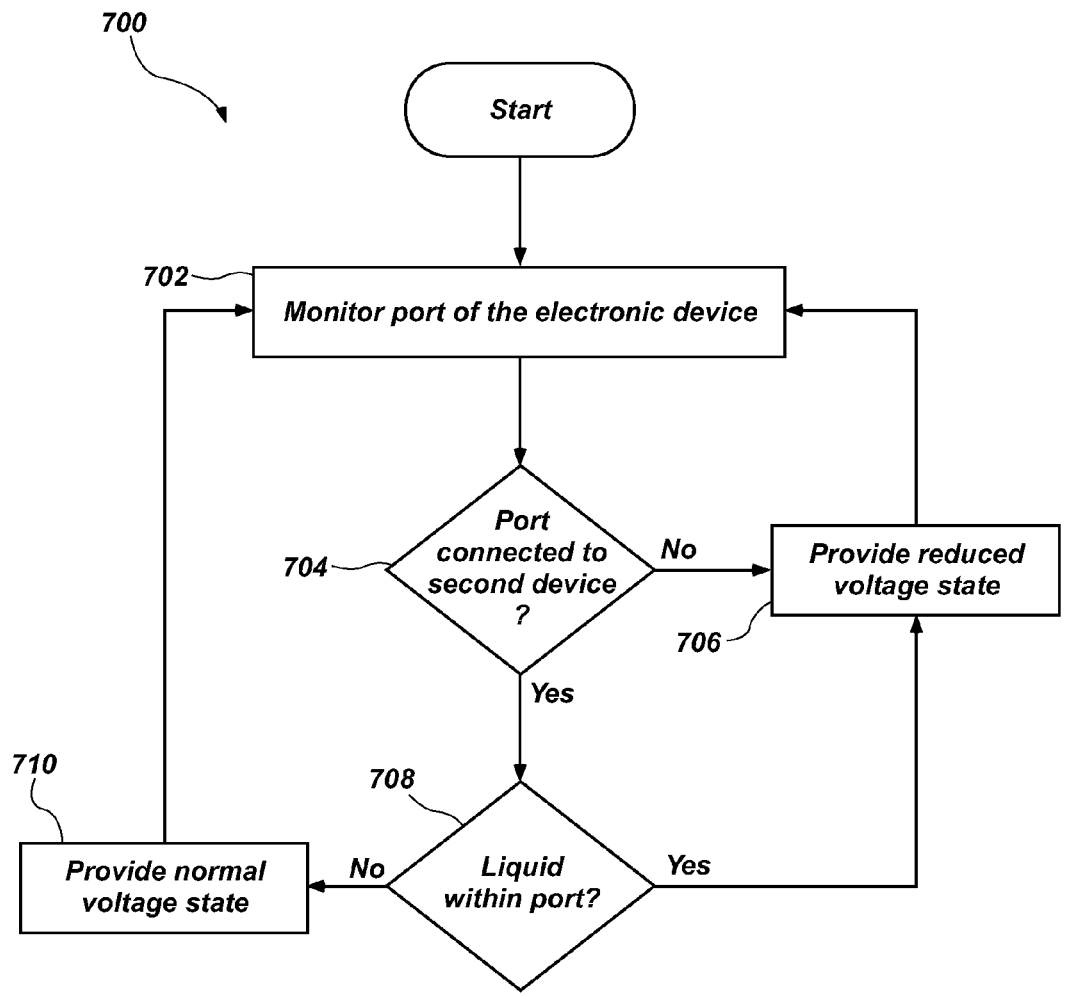
FIG. 7 is a flow chart illustrating an embodiment of a method for placing a port in a reduced voltage state.

Referring now to FIG. 7, a flow chart illustrating an embodiment of a method 700 for managing the voltage of a port 150 of an electronic device 110, such as that represented by FIG. 2, is provided. The method 700 begins, at reference numeral 702, with monitoring a port 150 of an electronic device 110. A device detector 210 monitors a state of the port 150 to determine whether or not a connector 160 is coupled with the port 150 or another electronic device 110' communicates with the electronic device 110 through the port 150. The device detector 210 may also monitor for possible exposure of the port 150 to moisture.

At reference numeral 704, the device detector 210 may determine whether or not a connector 160 associated with another electronic device 110' has been coupled with the port 150 or uncoupled from the port 150. If the device detector 210 determines that a connector 160 is not connected with the port 150, the device detector 210 may cause the power controller 212 to put the port 150 in a reduced voltage state, at reference numeral 706. Once the port 150 is in the reduced voltage state, the device detector 210 may continue to monitor the port 150 of the electronic device 110, at reference numeral 702. It may be unnecessary to proceed to a determination of whether liquid is within the port 150 if the port 150 is not connected to a second device 160 since the port 150 will already be in a reduced voltage state.

If the device detector 210 determines that a connector 160 and/or an associated electronic device 110' have been connected with the port 150, the power controller 212 may, at reference numeral 706, change the voltage state of the port 150 from the normal voltage state to the reduced voltage state.

The method 700 may also involve, at reference numeral 708, determining whether or not the port 150 is exposed to moisture. If the device detector 210 determines that the port 150 is exposed to moisture, the power controller 212 may, at reference numeral 706, cause the port 150 to enter the reduced voltage state even if the port 150 is connected to the second device 160. If the device detector 210 does not detect liquid within the port 150, the power controller 212 may provide, at reference numeral 710, a normal voltage state for the port 150. As a result, the electronic device 110 may exchange power and/or data with another electronic device 110' through the port 150.

Although the foregoing disclosure provides many specifics, these should not be construed as limiting the scope of any of the ensuing claims. Other embodiments may be devised which do not depart from the scopes of the claims. Features from different embodiments may be employed in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed is:

1. A portable electronic device, comprising:
    a processing element;
    a display in communication with the processing element;
    a rechargeable battery for supplying power to the processing element and the display;
    a data communication port that selectively receives power from the battery;
    a mechanical switch positioned within an opening of the data communication port and in communication with a device detector;
    a liquid sensor disposed at the opening of the data communication port; and
    a voltage control element associated with the data communication port and comprising:
        the device detector that detects whether the data communication port is:
            connected to another device; or
            not connected to another device;
        a power controller that:
            provides a normal voltage state from the battery to the data communication port in response to the device detector determining that the data communication port is connected to another device;
            provides a reduced voltage state for the data communication port in response to the device detector determining that the data communication port is not connected to another device;
    wherein the liquid sensor communicates with the power controller to prevent the data communication port from transitioning from the reduced voltage state to the normal voltage state in response to the liquid sensor sensing a liquid within the data communication port when another electronic device is connected to the communication port, and wherein the power controller intercepts messages to the data communication port and passes-through the messages only when the power controller provides the normal voltage state.

2. The portable electronic device of claim 1, wherein the reduced voltage state for the data communication port is approximately zero volts at each electrical connector of the data communication port.

3. The portable electronic device of claim 1, wherein the mechanical switch is actuated in response to another device being inserted into the data communication port.

4. The portable electronic device of claim 3, wherein the mechanical switch is actuated immediately prior to another device being electrically connected to the data communication port.

5. The portable electronic device of claim 3, wherein the mechanical switch includes a logical switch actuated in response to another device being connected to the data communication port.

6. The portable electronic device of claim 1, wherein:
    providing the normal voltage for the data communication port comprises electrically connecting the data communication port and a power source; and
    wherein providing the reduced voltage for the data communication port comprises electrically disconnecting the data communication port and the power source.

7. The portable electronic device of claim 1, wherein:
    providing the reduced voltage state comprises sending one or more commands decreasing voltage levels of the data communication port to predefined voltage levels for the reduced voltage state; and
providing the normal voltage state comprises sending one or more commands transitioning the voltage levels of the data communication port in the reduced voltage state to predefined voltage levels for the normal voltage state.

8. The portable electronic device of claim 1, wherein the data communication port is one of a dock connector and a universal serial bus (USB) connector.

9. The portable electronic device of claim 1, wherein t providing the normal voltage state comprises lowering voltage levels for one or more electrical connectors of the data communication port.

10. A system comprising:
a first portable electronic device including:
a processing element;
a display in communication with the processing element;
a rechargeable battery for supplying power to the processing element and the display;
a data communication port, the data communication port comprising one or more electrical connectors that selectively receive power from the battery, the data communication port configured to enable data to be communicated to and/or from the processing element;
a mechanical switch positioned within an opening of the data communication port;
a device detector in communication with the mechanical switch that detects whether the data communication port is:
connected to another device; or
not connected to another device;
a power controller that:
provides a normal voltage state from the battery at the one or more electrical connectors in response to the device detector determining that the data communication port is physically connected to a second device;
provides a reduced voltage state at the one or more electrical connectors in response to the device detector determining that the data communication port is not physically connected to the second device, and wherein the power controller intercepts messages to the data communication port and passes-through the messages only when the power controller provides the normal voltage state; and
the second electronic device, physically separate from the first electronic device, and including a port connector configured to be physically connected to the port of the first electronic device, the second electronic device configured to send data to the first electronic device and/or to receive data from the first electronic device through the port connector and through the data communication port of the first electronic device; and
a sealing element disposed on an exterior surface of the device proximate the data communication port preventing liquid from entering the data communication port of the first electronic device.

11. The system of claim 10, wherein the second electronic device includes a communication cable.

12. The system of claim 10, further comprising:
a fixed data communication port of the electronic device; and
a port adapter comprising:
an extender connector configured to be removably coupled to the fixed data communication port of the first electronic device.

13. A method comprising:
monitoring a data communication port of a portable electronic device that includes a processing element, a display in communication with the processing element and a battery that supplies power to the processing element and the display, the act of monitoring being conducted with at least one of a port controller and a processor of the portable electronic device;
determining whether the data communication port is:
connected to a second device separate from the portable electronic device; or not connected to the second device separate from the portable electronic device with at least one of the port controller and the processor;
providing a normal voltage state for the data communication port with the port controller with a battery of the portable electronic device in response to determining that the data communication port is connected to the second device by actuation of a mechanical switch within an opening of the data communication port;
providing a reduced voltage state for the data communication port with the port controller in response to determining that the data communication port is not connected to the second device by non-actuation of a mechanical switch within the opening of the data communication port;
intercepting messages to the data communication port at the port controller and passing-through the messages only when providing the normal voltage state; and
sensing for liquid within the data communication port and communicating from a liquid sensor disposed at the opening of the data communication port to the power controller to prevent the data communication port from transitioning from the reduced voltage state to the normal voltage state in response to the liquid sensor sensing a liquid within the data communication port when another electronic device is connected to the communication port.

* * * * *